US011821374B2

(12) United States Patent
Suzuki et al.

(10) Patent No.: US 11,821,374 B2
(45) Date of Patent: Nov. 21, 2023

(54) INTERNAL-COMBUSTION ENGINE CONTROL METHOD AND CONTROL DEVICE

(71) Applicant: NISSAN MOTOR CO., LTD., Yokohama (JP)

(72) Inventors: Kenji Suzuki, Kanagawa (JP); Ryouichi Ootaki, Kanagawa (JP); Yukiyo Yamada, Kanagawa (JP); Masashi Ono, Kanagawa (JP); Hiroshi Takada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/624,356

(22) PCT Filed: Jun. 28, 2017

(86) PCT No.: PCT/JP2017/023666
§ 371 (c)(1),
(2) Date: Dec. 19, 2019

(87) PCT Pub. No.: WO2019/003326
PCT Pub. Date: Jan. 3, 2019

(65) Prior Publication Data
US 2021/0156320 A1    May 27, 2021

(51) Int. Cl.
*F02D 15/02* (2006.01)
*F02D 13/02* (2006.01)
(Continued)

(52) U.S. Cl.
CPC ......... *F02D 15/02* (2013.01); *F02D 13/0234* (2013.01); *F02D 41/0007* (2013.01);
(Continued)

(58) Field of Classification Search
CPC .. F02D 15/02; F02D 13/0234; F02D 41/0007; F02D 41/1448; F02D 2041/001; F02D 2200/0406
See application file for complete search history.

(56) References Cited

U.S. PATENT DOCUMENTS 6,012,289 A * 1/2000 Deckard ............. F02D 41/0007
60/602
6,691,655 B2 * 2/2004 Aoyama ............. F02D 13/0238
123/90.16

(Continued)

FOREIGN PATENT DOCUMENTS

JP    2004-116434 A    4/2004
JP    2005-127200 A    5/2005

(Continued)

*Primary Examiner* — Gonzalo Laguarda
(74) *Attorney, Agent, or Firm* — Foley & Lardner LLP

(57) ABSTRACT

An internal-combustion engine includes a variable compression ratio mechanism for changing a mechanical compression ratio, and a variable valve timing mechanism for changing the valve timing of an intake valve. When acceleration is demanded, a target compression ratio is set to a lower compression ratio than the target value in a normal condition, and the valve timing is set to the advance angle side. Since the allowable combustion pressure decreases in a prescribed intermediate compression ratio region, if an actual compression ratio exists in the prescribed intermediate compression ratio region in the course of a compression ratio change accompanying acceleration, the variable compression ratio mechanism restricts the intake pressure by increasing a degree of opening of a wastegate valve or reducing a degree of opening of a throttle valve, for example.

12 Claims, 4 Drawing Sheets

(51) Int. Cl.
  *F02D 41/00*   (2006.01)
  *F02D 41/14*   (2006.01)
(52) U.S. Cl.
  CPC .... *F02D 41/1448* (2013.01); *F02D 2041/001* (2013.01); *F02D 2200/0406* (2013.01)

(56) References Cited

U.S. PATENT DOCUMENTS

| | | | | |
|---|---|---|---|---|
| 7,627,417 | B2* | 12/2009 | Akihisa | F02D 15/04 |
| | | | | 701/110 |
| 8,229,649 | B2* | 7/2012 | Akihisa | F02D 13/0269 |
| | | | | 701/103 |
| 9,581,077 | B2* | 2/2017 | Nakamura | F01L 13/0026 |
| 9,903,301 | B2* | 2/2018 | Shinozaki | F02D 13/0234 |
| 10,087,855 | B2 | 10/2018 | Takahashi | |
| 10,907,552 | B2* | 2/2021 | Suzuki | F02D 13/0269 |
| 2011/0094479 | A1* | 4/2011 | Akihisa | F02D 41/10 |
| | | | | 123/48 C |
| 2018/0187612 | A1* | 7/2018 | Takahashi | F02D 19/0673 |

FOREIGN PATENT DOCUMENTS

| | | | |
|---|---|---|---|
| JP | 2010-190193 | A | 9/2010 |
| JP | 2011-21524 | A | 2/2011 |
| WO | WO-2006/112256 | A1 | 10/2006 |
| WO | WO 2017/002254 | A1 | 1/2017 |

* cited by examiner

INTERNAL-COMBUSTION ENGINE CONTROL METHOD AND CONTROL DEVICE

TECHNICAL FIELD

The present invention relates to a control method and a control device for control in response to a request for acceleration in an internal combustion engine including a variable compression ratio mechanism structured to vary a mechanical compression ratio of the internal combustion engine.

BACKGROUND ART

Patent Document 1 discloses setting a target compression ratio of a variable compression ratio mechanism lower than that for steady state, in response to a request for acceleration, in an internal combustion engine including the variable compression ratio mechanism that employs a multi-link type piston crank mechanism.

During such control, the variable compression ratio employing the multi-link type piston crank mechanism has an actual compression ratio varying relatively slowly, although the target compression ratio of the variable compression ratio mechanism varies stepwise in response to the acceleration request. The acceleration causes increase in combustion pressure exerted on a piston.

A variable compression ratio mechanism may have a mechanical problem that, in case that the variable compression ratio mechanism has strength or tolerance against a combustion pressure exerted on a piston which is lower in a middle compression ratio region than in other compression ratio regions, the combustion pressure may have a maximum value exceeding a permissible value during variation in mechanical compression ratio.

PRIOR ART DOCUMENT(S)

Patent Document(s)

Patent Document 1: JP 2005-127200 A

SUMMARY OF THE INVENTION

A control method according to the present invention includes: setting a target compression ratio of a variable compression ratio mechanism lower than a regular value of target compression ratio which is based on engine operation condition under steady state, in response to presence of a request for acceleration; and restricting a maximum combustion pressure in a predetermined middle compression ratio region, during process in which the variable compression ratio mechanism varies in compression ratio to reach the target compression ratio.

The restriction of the maximum combustion pressure serves to suppress the variable compression ratio mechanism from undergoing harmful effect on tolerance of the variable compression ratio mechanism, in case that the variable compression ratio mechanism has a permissible combustion pressure lower in a middle compression ratio region than in other regions.

MODE(S) FOR CARRYING OUT THE INVENTION

The following describes a first embodiment of the present invention in detail with reference to the drawings.

Figure 1:
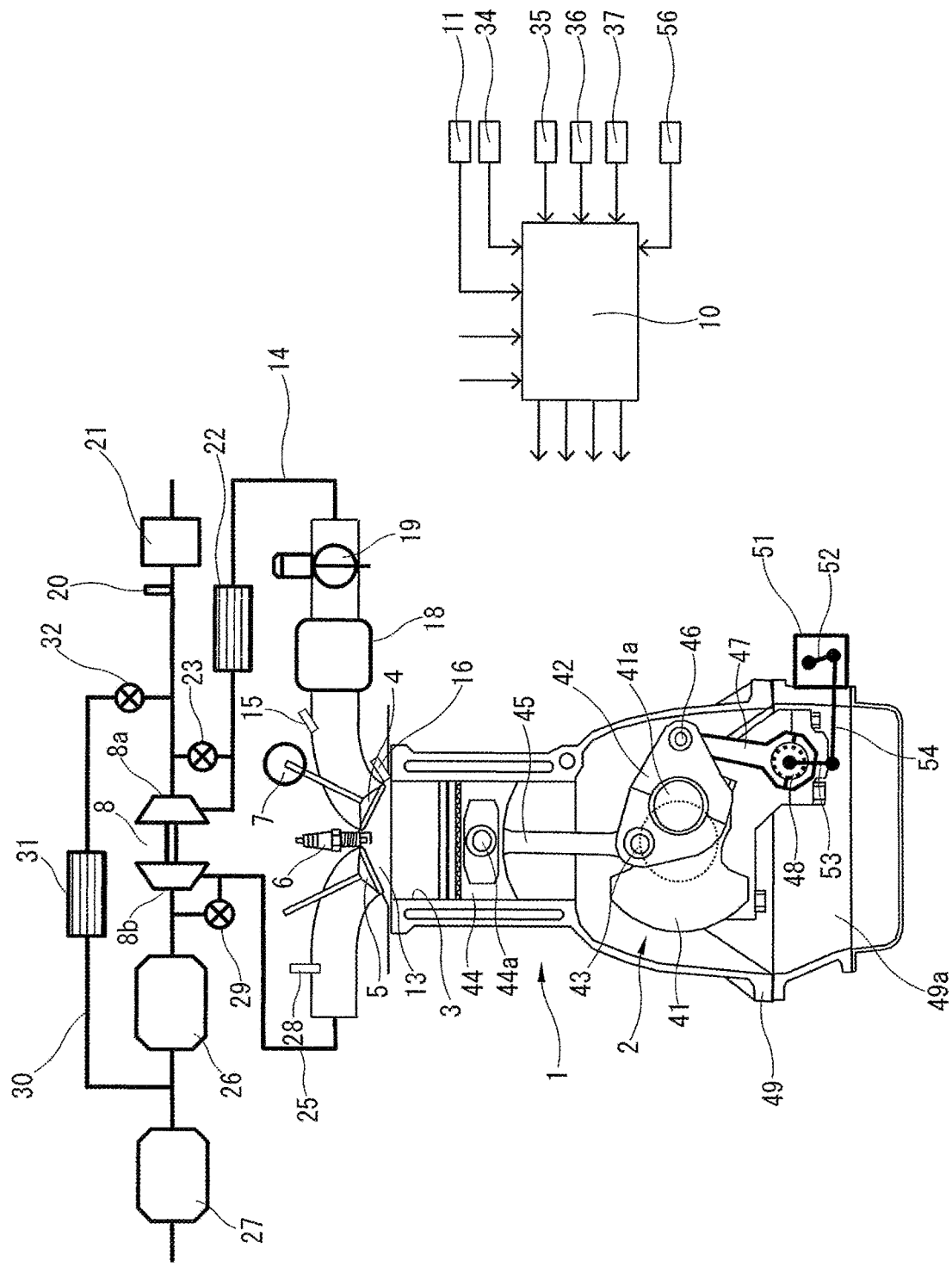
FIG. 1 is a schematic view showing system configurations of an internal combustion engine according to the present invention.

FIG. 1 shows system configurations of an internal combustion engine 1 for automobile according to the present invention. Internal combustion engine 1 is a spark ignition type internal combustion engine of four-stroke cycle, and includes: a variable compression ratio mechanism 2 employing a multi-link type piston crank mechanism; an intake valve 4 and an exhaust valve 5 which are disposed in a ceiling of a cylinder 3; a spark plug 6 disposed in a central part between intake valve 4 and exhaust valve 5; and a turbocharger 8 for supercharging using exhaust energy.

Intake valve 4 is provided with a variable valve timing mechanism 7 for intake that is structured to vary valve timing of intake valve 4. Variable valve timing mechanism 7 according to the present embodiment is configured to advance or delay valve opening timing and valve closing timing simultaneously by advancing or delaying a phase of a camshaft. Such variable valve timing mechanism has many known variations, and the present invention is not limited to one employing a variable valve timing mechanism of a specific mode.

Variable valve timing mechanism 7 exemplarily includes: a sprocket disposed concentrically at a front end of the camshaft; and a hydraulic rotational actuator structured to cause the sprocket and the camshaft to relatively rotate with respect to each other within a predetermined angle range. The sprocket is structured to coordinate with a crankshaft via a timing chain or a timing belt not shown. The relative rotation between the sprocket and the camshaft causes variation in phase of the camshaft with respect to a crank angle. The rotational actuator includes: an advancement-side oil pressure chamber for biasing to an advancement side by oil pressure, and a delay-side oil pressure chamber for biasing to a delay side by oil pressure. The rotational actuator is structured to advance or delay the phase of the camshaft by controlling oil pressures supplied to the oil pressure chambers via an oil pressure control valve not shown, in response to control signal sent from an engine controller 10. The camshaft thus-controlled in variable valve timing mechanism 7 has an actual controlled position corresponding to actual valve timing. The actual controlled position is monitored by a cam angle sensor 11 structured to measure a rotational position of the camshaft. The oil pressure supply via the oil pressure control valve is under closed-loop control configured such that the actual controlled position monitored by cam angle sensor 11 agrees with a target controlled position that is set depending on engine operation condition.

Engine controller 10 stores and carries a map including values of the target controlled position, wherein the map employs an engine load and an engine speed of internal combustion engine 1 as parameters representing the engine operation condition. The target controlled position is determined with reference to this map. The target controlled position is basically characterized in that the valve timing is relatively in the delay side under a low engine speed and is advanced with increase in the engine speed.

The intake valve is basically set to have an opening timing prior to top dead center and a closing timing posterior to bottom dead center. When variable valve timing mechanism 7 has advanced the valve timing, the intake valve opening timing is advanced to become farther from the top dead center, increasing a valve overlap with exhaust valve 5, and the intake valve closing timing becomes nearer to the bottom dead center, increasing a volumetric efficiency. Although exhaust valve 5 in the drawing is provided without a mechanism for varying valve timing, exhaust valve 5 according to the present invention may have a variable valve timing mechanism in addition to variable valve timing mechanism 7 of intake valve 4.

Via intake valve 4, a combustion chamber 13 is connected to an intake passage 14. In intake passage 14, a fuel injection valve 15 for port injection is disposed for each cylinder. To perform direct injection to an inside of cylinder 3, a fuel injection valve 16 for cylinder injection is disposed. Accordingly, the drawing shows an example employing a fuel injection system of so-called dual injection type in which fuel is supplied by using fuel injection valve 15 for port injection and fuel injection valve 16 for cylinder injection suitably depending on the engine load etc. In an upstream side of intake passage 14 with respect to an intake collector 18, an electrically controlled throttle valve 19 is disposed, wherein throttle valve 19 has an opening controlled depending on the control signal from engine controller 10. In the upstream side of this, a compressor 8a of turbocharger 8 is disposed. In the further upstream side of this, an air flow meter 20 and an air cleaner 21 are disposed, wherein air flow meter 20 is structured to monitor an amount of intake air. Between compressor 8a and throttle valve 19, an intercooler 22 is disposed. Furthermore, a recirculation valve 23 is disposed to perform communication between a discharge side and a suction side of compressor 8a. Recirculation valve 23 is structured to open in response to deceleration in which throttle valve 19 closes.

Via exhaust valve 5, combustion chamber 13 is connected to an exhaust passage 25. In exhaust passage 25, a turbine 8b of turbocharger 8 is disposed. In a downstream side of exhaust passage 25 with respect to turbine 8b, a pre-catalyst 26 and a main catalyst 27 are disposed, wherein each of them employs a three-way catalyst. In an upstream side of exhaust passage 25 with respect to turbine 8b, an air-fuel ratio sensor 28 structured to monitor an air-fuel ratio is disposed. Turbine 8b is provided with a wastegate valve 29 structured to bypass a part of exhaust gas depending on a boost pressure, for control of the boost pressure. Wastegate valve 29 is an electrically controlled wastegate valve that has an opening controlled depending on the control signal from engine controller 10 via an actuator employing an electric motor.

An exhaust gas recirculation passage 30 is disposed to connect between a point in the downstream side of exhaust passage 25 with respect to turbine 8b and a point in the upstream side of intake passage 14 with respect to compressor 8a. Exhaust gas recirculation passage 30 is structured to return a part of the exhaust gas to the intake system, and includes an EGR gas cooler 31 and an EGR valve 32.

Engine controller 10 is structured to receive signals from sensors such as: cam angle sensor 11, air flow meter 20, and air-fuel ratio sensor 28 described above; a crank angle sensor 34 structured to monitor the engine speed; a water temperature sensor 35 structured to monitor a temperature of cooling-water; an accelerator-opening sensor 36 structured to monitor a torque request caused by a driver, based on measurement of a stepping amount of an accelerator pedal operated by the driver; and a boost pressure sensor 37 structured to monitor the boost pressure (an intake pressure) in intake collector 18. Based on these signals, engine controller 10 suitably controls: an amount and timing of fuel injection performed by fuel injection valves 15 and 16; timing of spark performed by spark plug 6; a mechanical compression ratio of variable compression ratio mechanism 2; the valve timing of intake valve 4 operated by variable valve timing mechanism 7; the opening of throttle valve 19; the opening of wastegate valve 29; and an opening of EGR valve 32.

Variable compression ratio mechanism 2 employs a known multi-link type piston crank mechanism disclosed by Patent Document 1, JP 2004-116434 A, etc., and includes: a lower link 42 supported rotatably by a crank pin 41a of a crank shaft 41; an upper link 45 connecting an upper pin 43 disposed at a first end of lower link 42 to a piston pin 44a of a piston 44; a control link 47 having a first end connected to a control pin 46 disposed at a second end of lower link 42; and a control shaft 48 supporting swingably a second end of control link 47. Crank shaft 41 and control shaft 48 are rotatably supported via bearing structures not shown, in a crank case 49a in a lower part of a cylinder block 49. Control shaft 48 includes an eccentric shaft structured to move due to rotation of control shaft 48, wherein the eccentric shaft is rotatably fitted with the second end of control link 47 in detail. Thus, the rotation of control shaft 48 causes variation in position of control link 47 supported swingably. In thus-configured variable compression ratio mechanism 2, the rotation of control shaft 48 causes piston 44 to vary its top dead center position in a vertical direction, and thereby results in variation in mechanical compression ratio.

According to the present embodiment, variable compression ratio mechanism 2 includes an electric actuator 51 that is an actuator for control of variation in compression ratio of variable compression ratio mechanism 2. Electric actuator 51 is disposed on an outer periphery of crank case 49a, and has a rotational axis parallel with crank shaft 41. Electric actuator 51 is structured to coordinate with control shaft 48 via: a first arm 52 connected to an output rotational shaft of electric actuator 51; a second arm 53 connected to control shaft 48; and an intermediate link 54 connecting first arm 52 to second arm 53. Furthermore, electric actuator 51 includes an electric motor and a transmission mechanism disposed in series along the axis.

An actual compression ratio, which is an actual value of the mechanical compression ratio controlled via variable compression ratio mechanism 2 as described above, is monitored by an actual compression ratio sensor 56. Actual compression ratio sensor 56 exemplarily includes a rotary potentiometer or a rotary encoder in order to monitor a rotational angle of control shaft 48 or a rotational angle of the output rotational shaft of electric actuator 51. Alternatively, the actual compression ratio may be monitored with no additional sensor by calculating a rotational amount of the electric motor of electric actuator 51 with reference to command signal sent to the electric motor, and then calculating the rotational angle of control shaft 48 with reference to the rotational amount of the electric motor.

Electric actuator 51 is controlled and operated by engine controller 10 such that the actual compression ratio determined as described above agrees a target compression ratio corresponding to the engine operation condition. Engine controller 10 exemplarily stores and carries the map of the values of target compression ratio, wherein the map employs the engine load and the engine speed of internal combustion engine 1 as the parameters representing the engine operation condition, and is configured to set the target compression ratio with reference to this map. The target compression ratio is basically set to be high in a low engine load, and be reduced with increase in engine load in order to suppress knocks etc.

Variable compression ratio mechanism 2 employing the multi-link type piston crank mechanism as described above has a characteristic that due to link geometry, this mechanism has relatively low strength or tolerance against a combustion pressure exerted on piston 44 in a middle compression ratio region existing between a maximum compression ratio and a minimum compression ratio. In other words, variable compression ratio mechanism 2 has a permissible combustion pressure that is lower in the middle compression ratio region than at the maximum compression ratio or at the minimum compression ratio, wherein the permissible combustion pressure is defined as an upper limit of the combustion pressure that does not cause mechanical damage in variable compression ratio mechanism 2, considering suitable safety factor.

It is unfavorable that a maximum combustion pressure exceeds the permissible combustion pressure, even transiently during engine operation, in view of tolerance of variable compression ratio mechanism 2. In view of the foregoing, it is favorable to regulate the maximum combustion pressure upon acceleration such that the maximum combustion pressure does not exceed the permissible combustion pressure in the middle compression ratio region in which the permissible combustion pressure is lowered.

Figure 2:
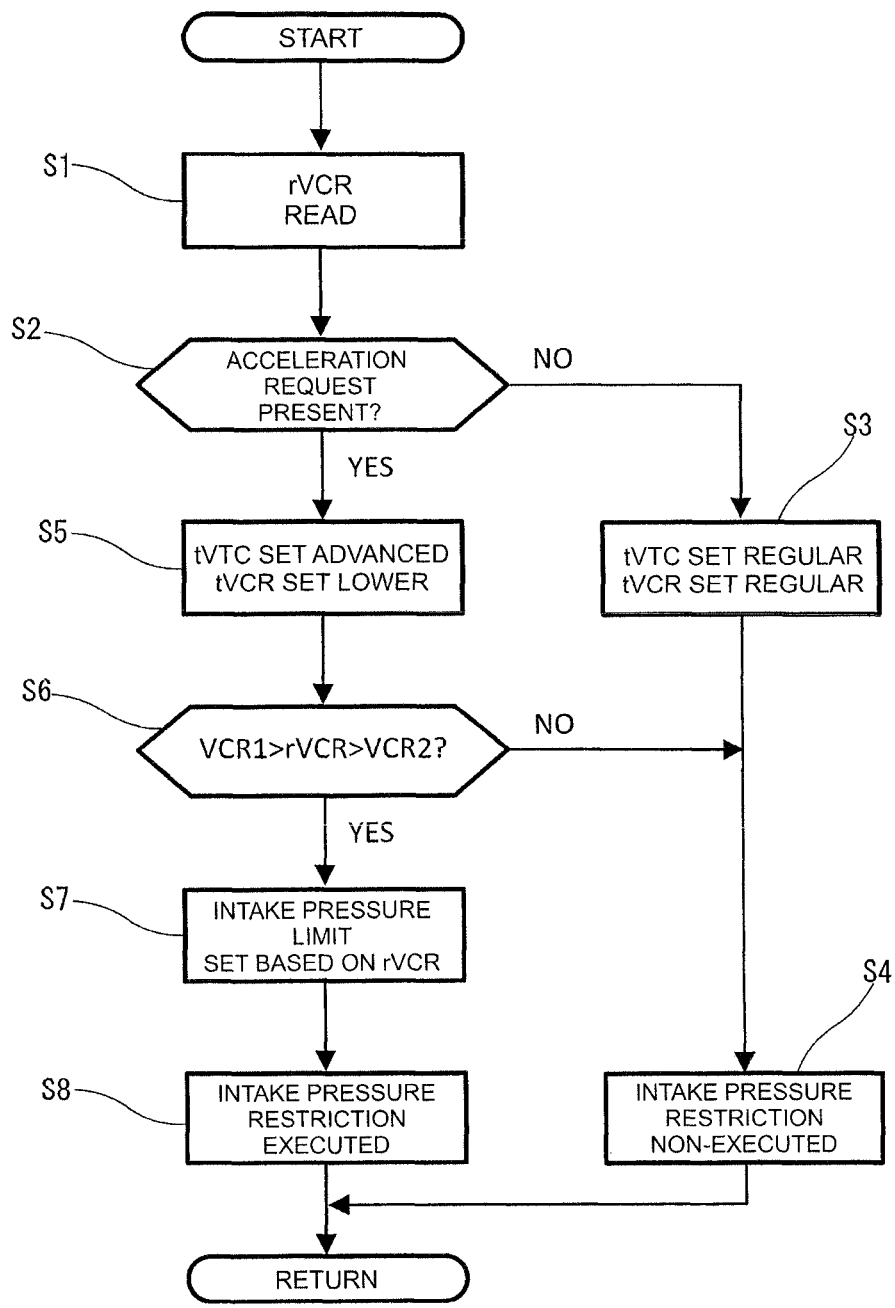
FIG. 2 is a flow chart showing control in response to acceleration.

The following specifically describes control implemented by engine controller 10 upon the acceleration, with reference to a flow chart of FIG. 2. The flow chart shows a routine to be executed repeatedly at suitable intervals such as minute time intervals.

Step 1, which is shown as S1 in the drawing, is reading of actual compression ratio rVCR monitored by actual compression ratio sensor 56. Step 2 is determination of whether there is a request of acceleration. The acceleration request is exemplarily judged based on an amount or a rate of variation in opening of the accelerator pedal which is monitored by accelerator-opening sensor 36. In detail, step 2 is implemented with reference to a judgement result of another routine not shown which is configured to sequentially determine whether there is the acceleration request rapid over a predetermined level. Furthermore, step 2 may be configured to additionally determine a degree of the acceleration request: a degree of the amount or the rate of variation in opening of the accelerator pedal.

When the acceleration request has been determined absent in step 2, step 3 is implemented to perform normal control for steady state. This control specifically includes: setting a value of target controlled position tVTC of variable valve timing mechanism 7 to a regular value of target controlled position for steady state which corresponds to the engine operation condition (i.e., the engine load and the engine speed) at that moment; and similarly setting a value of target compression ratio tVCR of variable compression ratio mechanism 2 to a regular value of target compression ratio for steady state which corresponds to the engine operation condition (i.e., the engine load and the engine speed) at that moment. After step 3, step 4 is implemented: i.e., control for restriction of intake pressure described in the following is not executed.

When the acceleration request has been determined present in step 2, step 5 is implemented to: adjust target controlled position tVTC of variable valve timing mechanism 7 to advance it with respect to the regular target controlled position for steady state which corresponds to the engine operation condition (i.e., the engine load and the engine speed) at that moment; and adjust target compression ratio tVCR of variable compression ratio mechanism 2 to make it lower than the regular target compression ratio for steady state which corresponds to the engine operation condition (i.e., the engine load and the engine speed) at that moment. This configuration serves to suppress knockings and simultaneously improve an output torque. In particular, in the present embodiment that employs turbocharger 8 and may undergo a response lag of turbocharger 8 in an early stage of acceleration, the above configuration serves to improve the output torque during the response lag, and thereby improve acceleration performance. Each of an amount of the advancing adjustment of target controlled position tVTC of variable valve timing mechanism 7 and an amount of the lowering adjustment of target compression ratio tVCR of variable compression ratio mechanism 2 in response to the acceleration request may be set constant, or may be set variable depending on the degree of the acceleration request.

Setting target compression ratio tVCR as described above causes variable compression ratio mechanism 2 to vary the mechanical compression ratio to reach the target compression ratio tVCR via electric actuator 51. Step 6 is determination of whether actual compression ratio rVCR is in the middle compression ratio region (i.e., a region between a first middle compression ratio VCR1 and a second middle compression ratio VCR2) in which the permissible combustion pressure is lower than in other regions. When it has been determined that actual compression ratio rVCR is out of this predetermined middle compression ratio region (i.e., rVCR≥VCR1 or rVCR≤VCR2), step 4 is implemented after step 6: i.e., the control for intake pressure restriction described in the following is not executed.

When it has been determined in step 6 that a condition of VCR1>rVCR>VCR2 is satisfied, step 7 is implemented to determine an intake pressure limit Plim on the basis of actual compression ratio rVCR at that moment. Intake pressure limit Plim is an upper limit of intake pressure which is determined such that the maximum combustion pressure during combustion cycles of internal combustion engine 1 does not exceed the permissible combustion pressure depending on actual compression ratio rVCR at that moment. Engine controller 10 stores and carries a table of values of intake pressure limit Plim which are predetermined employing the mechanical compression ratio as a parameter. With reference to this table, intake pressure limit Plim corresponding to actual compression ratio rVCR at that moment is determined in step 7. Intake pressure limit Plim may be the intake pressure (the boost pressure) itself in the downstream of throttle valve 19, or may be replaced with another parameter corresponding to the intake pressure.

After step 7, step 8 is implemented to restrict the intake pressure on the basis of intake pressure limit Plim that has been determined in step 7. In response to the acceleration request, the intake pressure rises rapidly to perform a required torque. In case that the intake pressure would exceed intake pressure limit Plim corresponding to actual compression ratio rVCR, the intake pressure is restricted to intake pressure limit Plim. For example, the intake pressure in the downstream of throttle valve 19 is restricted to intake pressure limit Plim by using an intake-pressure-varying device(s): for example, by adjusting increasingly the opening of wastegate valve 29 of turbocharger 8 and thereby reducing the boost pressure; and/or by adjusting decreasingly the opening of throttle valve 19. This serves to suppress the maximum combustion pressure during the combustion cycles from exceeding the permissible combustion pressure corresponding to actual compression ratio rVCR at that moment.

In response to the acceleration, the intake pressure is restricted by increasing an amount of bypassing of turbocharger 8 and/or by reducing an amount of the opening of throttle valve 19, in order to suppress the maximum combustion pressure from exceeding the permissible combustion pressure of variable compression ratio mechanism 2 under actual compression ratio rVCR at that moment, as long as actual compression ratio rVCR is in the middle compression ratio region between first middle compression ratio VCR1 and second middle compression ratio VCR2, in process of variation in compression ratio in which actual compression ratio rVCR decreases from the mechanical compression ratio before the acceleration to reach the target compression ratio tVCR.

Figure 3:
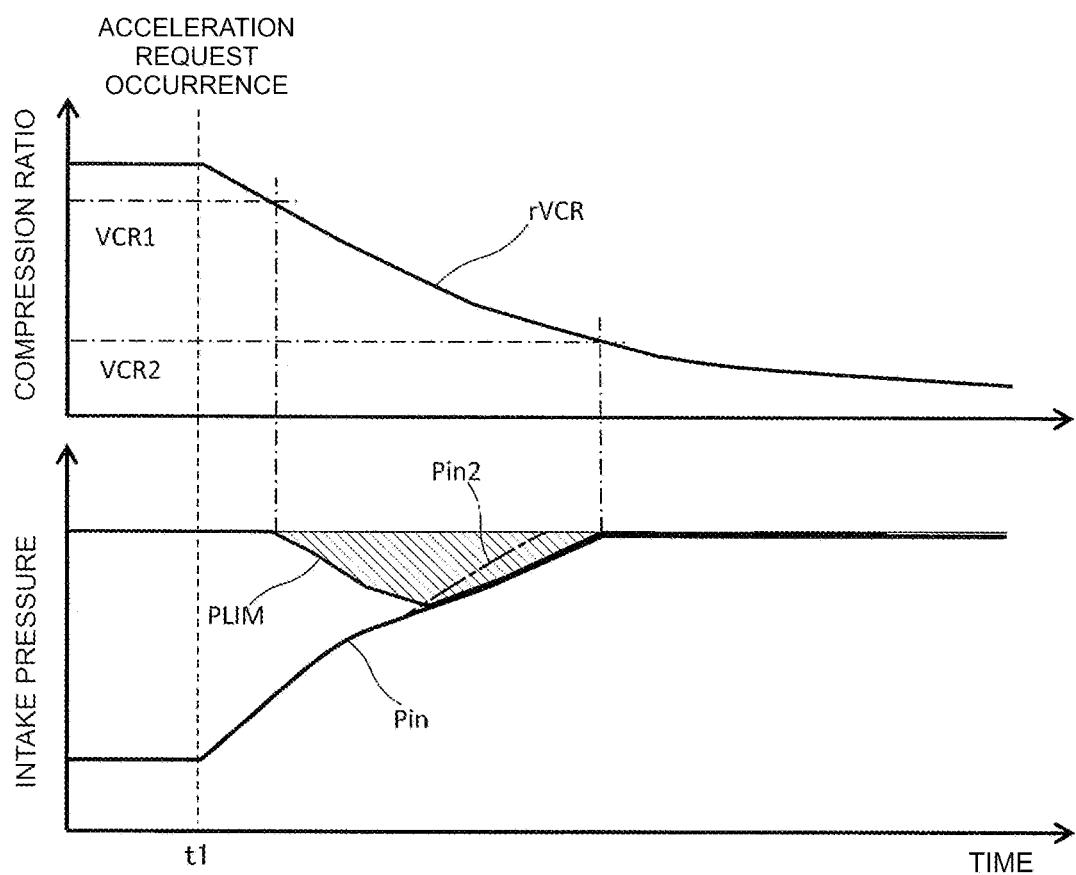
FIG. 3 is a time series chart showing variation in actual compression ratio and variation in intake pressure in response to the acceleration.

FIG. 3 is a time series chart contrasting variation in compression ratio (actual compression ratio rVCR) and variation in intake pressure in response to the acceleration request as described above. In this example, the acceleration request occurs at a time instant t1 under steady state that internal combustion engine 1 is operated in a relatively low engine load and target compression ratio tVCR is high. After the acceleration request, target compression ratio tVCR is reduced stepwise, and variable compression ratio mechanism 2 is operated via electric actuator 51 in order to reach the target compression ratio tVCR. Actual compression ratio rVCR of variable compression ratio mechanism 2 employing the multi-link type piston crank mechanism varies relatively slowly, and therefore decreases gradually as shown in the drawing although the target compression ratio tVCR decreases stepwise. For example, it needs approximately one to two seconds from a time instant (t1) until completion of convergence of actual compression ratio rVCR to target compression ratio tVCR. Thus, in process in which actual compression ratio rVCR varies to finally reach the target compression ratio tVCR, actual compression ratio rVCR passes through the predetermined middle compression ratio region between VCR1 and VCR2 in which the permissible combustion pressure is lower.

FIG. 3 shows a line PLIM representing behavior of the permissible combustion pressure of variable compression ratio mechanism 2: in detail, behavior of a permissible intake pressure which is drawn based on the permissible combustion pressure converted into the intake pressure. As described above, due to link geometry, variable compression ratio mechanism 2 employing the multi-link type piston crank mechanism is lower in permissible combustion pressure in the predetermined middle compression ratio region whose upper limit and lower limit are respectively first middle compression ratio VCR1 and second middle compression ratio VCR2, and is similarly lower in permissible intake pressure in view of permissible combustion pressure. FIG. 3 shows a hatched area in which the permissible combustion pressure is lower. Intake pressure limit Plim is set based on behavior of line PLIM falling in the predetermined middle compression ratio region. In other words, permissible intake pressure PLIM and intake pressure limit Plim are substantially equivalent to each other in the middle compression ratio region between VCR1 and VCR2.

As shown by a line Pin, the intake pressure rises in response to the acceleration request from time instant t1 on. In detail, the intake pressure rises relatively quickly due to increase in opening of throttle valve 19, operation of turbocharger 8 (increase in engine speed), and advancement in valve timing of intake valve 4 etc., in response to the acceleration request. Accordingly, as shown by a virtual line Pin 2, the intake pressure in the middle compression ratio region may exceed permissible intake pressure PLIM corresponding to the permissible combustion pressure, depending on various conditions. According to the first embodiment, in case that the intake pressure would exceed permissible intake pressure PLIM, the intake pressure restriction control is implemented to restrict the intake pressure to permissible intake pressure PLIM (i.e., intake pressure limit Plim) as shown by the solid line Pin, by increasing the opening of wastegate valve 29 and/or by reducing the opening of throttle valve 19. This serves to suppress the actual maximum combustion pressure from exceeding the permissible combustion pressure of variable compression ratio mechanism 2, and thereby reduce harmful effect on tolerance of variable compression ratio mechanism 2.

Thus, the first embodiment serves to suppress the maximum combustion pressure from exceeding the permissible combustion pressure in process upon the acceleration request, and eliminate need for excessive enhancement in strength and rigidity of parts of variable compression ratio mechanism 2, and allows the parts to be configured to have minimal strength and rigidity. The enhancement in strength and rigidity of the parts may cause increase in size and weight thereof, and result in disadvantage such as deterioration in responsiveness upon compression ratio variation and increase in power consumption of electric actuator 51. The first embodiment serves to improve the tolerance of variable compression ratio mechanism 2 without such disadvantage.

The permissible combustion pressure is high in both of: a region in which actual compression ratio rVCR is greater than first middle compression ratio VCR1; and a region in which actual compression ratio rVCR is less than second middle compression ratio VCR2. For example, in case that actual compression ratio rVCR is less than second middle compression ratio VCR2, the permissible combustion pressure is high enough to eliminate need for the intake pressure restriction control even when the intake pressure rises to its maximum in response to the acceleration.

Even in case that the acceleration request is absent, target compression ratio tVCR may enter the middle compression ratio region between VCR1 and VCR2 under steady operating state. However, the intake pressure restriction control is unnecessary in such case, because the intake pressure is low enough to prevent the maximum combustion pressure from exceeding the permissible combustion pressure, under operating states except the acceleration.

Figure 4:
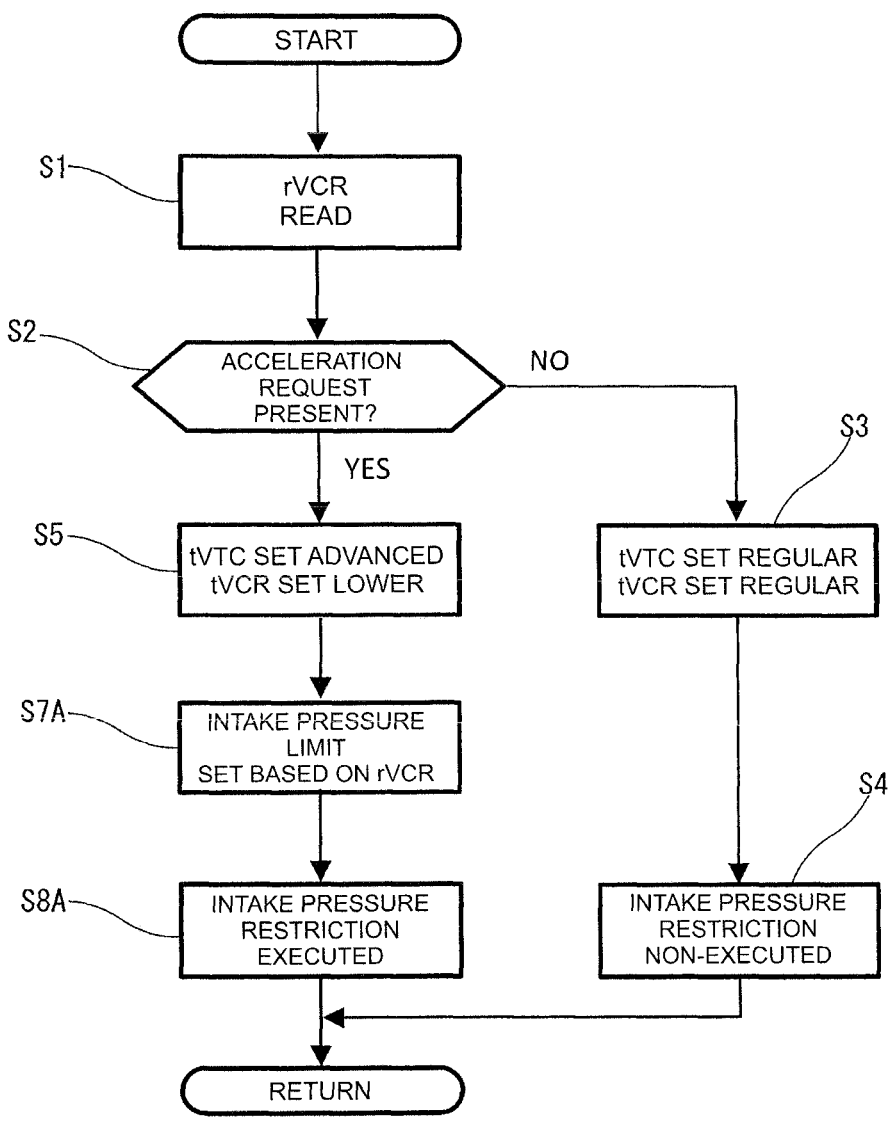
FIG. 4 is a flow chart showing control in response to the acceleration according to a second embodiment of the present invention.

FIG. 4 shows a flow chart according to a second embodiment. Steps 1 to 5 according to the second embodiment are same with those shown in the flow chart of FIG. 2.

Specifically, step 1 is the reading of actual compression ratio rVCR. Step 2 is the determination of whether the acceleration request is present. In case that the acceleration request is absent, steps 3 and 4 are implemented to perform the normal control.

In case that the acceleration request is present, step 5 is implemented after step 2 in order to: adjust target controlled position tVTC of variable valve timing mechanism 7 to advance it with respect to the regular target controlled position for steady state which corresponds to the engine operation condition (i.e., the engine load and the engine speed) at that moment; and adjust target compression ratio tVCR of variable compression ratio mechanism 2 to make it lower than the regular target compression ratio for steady state which corresponds to the engine operation condition (i.e., the engine load and the engine speed) at that moment.

Then, step 7A is implemented to determine intake pressure limit Plim with reference to actual compression ratio rVCR at that moment. Intake pressure limit Plim is the upper limit of intake pressure which is determined such that the maximum combustion pressure during the combustion cycles of internal combustion engine 1 does not exceed the permissible combustion pressure based on actual compression ratio rVCR at that moment. Engine controller 10 has the table of the values of intake pressure limit Plim which has been prepared beforehand employing the mechanical compression ratio as the parameter. With reference to this table, intake pressure limit Plim corresponding to actual compression ratio rVCR at that moment is determined in step 7A.

In addition, according to the second embodiment, the table is prepared to include values of intake pressure limit Plim which correspond to values of the mechanical compression ratio, not throughout only the predetermined middle compression ratio region between VCR1 and VCR2, but throughout an entire region under control of variable compression ratio mechanism 2. In this table, the values of intake pressure limit Plim are set based on the behavior of the permissible combustion pressure as shown by line PLIM in FIG. 3 which is derived by converting the permissible combustion pressure of variable compression ratio mechanism 2 into the intake pressure. Specifically, the values of intake pressure limit Plim are set to: values in conformance with values of maximum intake pressure determined with reference to turbocharger 8 etc., in a high compression ratio region at and above first middle compression ratio VCR1 or in a low compression ratio region at and below second middle compression ratio VCR2; and relatively low values in conformance with the behavior of the permissible combustion pressure or permissible intake pressure PLIM, in the middle compression ratio region between first middle compression ratio VCR1 and second middle compression ratio VCR2.

After step 7A, step 8A is implemented to restrict the intake pressure on the basis of intake pressure limit Plim that has been set in step 7A. In response to the acceleration request, the intake pressure rises rapidly to perform the required torque. In case that the intake pressure would exceed intake pressure limit Plim corresponding to actual compression ratio rVCR, the intake pressure is restricted to intake pressure limit Plim. For example, the intake pressure in the downstream of throttle valve 19 is restricted to intake pressure limit Plim by adjusting increasingly the opening of wastegate valve 29 of turbocharger 8 and thereby reducing the boost pressure, and/or by adjusting decreasingly the opening of throttle valve 19. This serves to suppress the maximum combustion pressure during the combustion cycles from exceeding the permissible combustion pressure corresponding to actual compression ratio rVCR at that moment.

According to the flow chart of the second embodiment, step 8A is implemented regardless of a value of actual compression ratio rVCR. However, in the high compression ratio region at and above first middle compression ratio VCR1 or in the low compression ratio region at and below second middle compression ratio VCR2, the values of intake pressure limit Plim are high enough to substantially prevent the intake pressure restriction from being implemented. In case that actual compression ratio rVCR is in the middle compression ratio region between first middle compression ratio VCR1 and second middle compression ratio VCR2, the intake pressure restriction control based on intake pressure limit Plim is implemented similarly to the first embodiment. Thus, the second embodiment is configured without step 6 shown in the flow chart of the first embodiment which is judgement of region of actual compression ratio rVCR.

The invention claimed is:

1. A control method for an internal combustion engine including a variable compression ratio mechanism that is composed of a multi-link type piston crank mechanism, and is structured to vary a mechanical compression ratio of the internal combustion engine, and has tolerance against combustion pressure wherein the tolerance is relatively low in a middle compression ratio region between a maximum compression ratio and a minimum compression ratio, the control method comprising:
    setting a target compression ratio of the variable compression ratio mechanism lower than a regular value of a target compression ratio which is based on an engine operation condition under steady state, in response to presence of a request for acceleration; and
    restricting a maximum combustion pressure to be lower in a predetermined middle compression ratio region than in a high compression ratio region with respect to the predetermined middle compression ratio region, by restricting an intake pressure to be lower than a predetermined intake pressure limit when the variable compression ratio mechanism varies in compression ratio to reach the target compression ratio,
    wherein the intake pressure limit is predetermined so as to prevent the maximum combustion pressure from exceeding a permissible combustion pressure.

2. The control method as claimed in claim 1, wherein:
the internal combustion engine further includes an intake valve and a variable valve timing mechanism structured to vary valve timing of the intake valve; and
the control method further comprises:
    setting a target controlled position of the variable valve timing mechanism to be advanced with respect to a regular value of target controlled position which is based on the engine operation condition under steady state, in response to presence of the request for acceleration.

3. The control method as claimed in claim 1, wherein:
the internal combustion engine further includes a turbocharger; and
the restriction of the maximum combustion pressure is performed by reducing a boost pressure of the turbocharger.

4. The control method as claimed in claim 1, wherein:
the internal combustion engine further includes a throttle valve; and
the restriction of the maximum combustion pressure is performed by reducing an opening of the throttle valve.

5. The control method as claimed in claim 1, the control method further comprising:
monitoring an actual compression ratio of the variable compression ratio mechanism,
    wherein the restriction of the maximum combustion pressure is implemented in response to satisfaction of a condition that the actual compression ratio is in the predetermined middle compression ratio region.

6. The control method as claimed in claim 5, the control method further comprising:

predetermining values of the intake pressure limit which correspond to values of the mechanical compression ratio, throughout the predetermined middle compression ratio region, wherein the restriction of the maximum combustion pressure is implemented based on the intake pressure limit corresponding to the actual compression ratio, in response to satisfaction of the condition that the actual compression ratio is in the predetermined middle compression ratio region.

7. The control method as claimed in claim 5, the control method further comprising:

predetermining values of the intake pressure limit which correspond to values of the mechanical compression ratio, throughout an entire region under control of the variable compression ratio mechanism; and setting the values of the intake pressure limit in the predetermined middle compression ratio region to be lower than the values of the intake pressure limit in other regions, wherein the restriction of the maximum combustion pressure is implemented based on the intake pressure limit corresponding to the actual compression ratio, in response to satisfaction of the condition that the actual compression ratio is in the predetermined middle compression ratio region.

8. The control method as claimed in claim 1, wherein the restriction of the maximum combustion pressure is implemented based on behavior of a permissible combustion pressure determined depending on a mechanical structure of the variable compression ratio mechanism.

9. The control method as claimed in claim 1, wherein:

the multi-link type piston crank mechanism includes a piston, a crank shaft, a crank pin of the crank shaft, an upper link, a lower link, and a control link;

the upper link includes a first end connected to the piston, and a second end connected to a first end of the lower link;

the lower link is rotatably supported by the crank pin, and includes a second end connected to a first end of the control link;

the control link includes a second end supported swingably to be variable in position with respect to a body of the internal combustion engine; and the variable compression ratio mechanism is structured such that the mechanical compression ratio varies due to the variation in position of the control link with respect to the body of the internal combustion engine.

10. The control method as claimed in claim 1, wherein the restriction of the intake pressure is performed by increasing an opening of a wastegate valve.

11. A control device for an internal combustion engine, the control device comprising:

a variable compression ratio mechanism that is composed of a multi-link type piston crank mechanism, and includes an actuator, and is structured to vary a mechanical compression ratio of the internal combustion engine due to action of the actuator, and has tolerance against combustion pressure wherein the tolerance is relatively low in a middle compression ratio region between a maximum compression ratio and a minimum compression ratio;

a sensor structured to monitor a request for torque caused by a driver;

a storage configured to store regular values of target compression ratio which are based on engine operation condition under steady state, for determination of a target compression ratio of the variable compression ratio mechanism;

an intake-pressure-restrictor structured to restrict an intake pressure of the internal combustion engine to be lower than a predetermined intake pressure limit; and a controller configured to:
set the target compression ratio of the variable compression ratio mechanism lower than the regular value of target compression ratio, in response to satisfaction of a condition that the sensor detects a request for acceleration; and restrict a maximum combustion pressure to be lower in a predetermined middle compression ratio region than in a high compression ratio region with respect to the predetermined middle compression ratio region, by using the intake-pressure-restrictor, when the variable compression ratio mechanism varies in compression ratio to reach the target compression ratio, wherein the intake pressure limit is predetermined so as to prevent the maximum combustion pressure from exceeding a permissible combustion pressure.

12. The control device as claimed in claim 11, wherein:
the intake-pressure-restrictor is a wastegate valve; and
the restriction of the intake pressure is performed by increasing an opening of the wastegate valve.

* * * * *